United States Patent [19]

Blackborow

[11] Patent Number: 5,254,669
[45] Date of Patent: Oct. 19, 1993

[54] CROSSLINKED POLYMER FROM LONG ALKYL CHAIN POLYAMINE

[75] Inventor: John R. Blackborow, Edinburgh, Scotland

[73] Assignee: BP Chemicals Limited, London, England

[21] Appl. No.: 934,928

[22] Filed: Aug. 25, 1992

[30] Foreign Application Priority Data

Aug. 30, 1991 [FR] France .................. 91 11018

[51] Int. Cl.$^5$ .................. C08G 69/26
[52] U.S. Cl. .................. 528/342; 44/418; 252/47; 524/606; 528/310; 528/328; 528/343; 528/345; 528/353
[58] Field of Search .......... 528/342, 345, 310, 328, 528/343, 353; 524/606; 44/418; 252/47

[56] References Cited

U.S. PATENT DOCUMENTS

| | | | |
|---|---|---|---|
| 2,682,524 | 6/1954 | Coffman | 528/342 |
| 3,374,174 | 3/1968 | Le Suer | 252/51.5 |
| 4,975,499 | 12/1990 | Bachem et al. | 528/342 |

FOREIGN PATENT DOCUMENTS

| | | |
|---|---|---|
| 1018982 | 3/1967 | Canada . |
| 72645 | 2/1983 | European Pat. Off. . |
| 213027 | 3/1987 | European Pat. Off. . |
| 271937 | 6/1988 | European Pat. Off. . |
| 373829 | 6/1990 | European Pat. Off. . |
| 400866 | 12/1990 | European Pat. Off. . |
| 422857 | 4/1991 | European Pat. Off. . |
| 77043723 | 11/1977 | Japan . |
| 2140811 | 12/1984 | United Kingdom . |

OTHER PUBLICATIONS

U.S. Pat. No. 4,927,562 (abstract only).
U.S. Pat. No. 4,663,064 (abstract only).
U.S. Pat. No. 5,062,980 (abstract only).
U.S. Pat. No. 4,548,724 (abstract only).
U.S. Pat. No. 3,287,271 (abstract only).
U.S. Pat. No. 4,803,003 (abstract only).

*Primary Examiner*—Harold D. Anderson
*Attorney, Agent, or Firm*—Brooks Haidt Haffner & Delahunty

[57] ABSTRACT

The present invention relates to a process for the manufacture of a crosslinked polymer, wherein a crosslinking reaction is carried out between an organic crosslinking agent which is a polyacid or a derivative of a polyacid, and a long chain alkylpolyamine having at least two amine functional groups which may be primary and/or secondary and which is not a succinimide. The long chain alkylpolyamine can be obtained by a method comprising reacting a corresponding long chain alkylcarbonyl compound with an amine. The long chain carbonyl compound is for example prepared by ozonolysis of a polyolefin which can be a polybutene. The obtained crosslinked polymer can be used as an additive in lubricant compositions.

15 Claims, No Drawings

CROSSLINKED POLYMER FROM LONG ALKYL CHAIN POLYAMINE

The present invention relates to a process for the manufacture of a crosslinked polymer, in particular suitable for use as an additive in lubricant compositions.

To prepare a lubricant composition, it is known to add to an oil, additives such as antioxidants, detergents, dispersing agents and agents to improve the viscosity index thereof. It is also known to add to an oil a compound or a composition having two or more of these effects. Thus, according to U.S. Pat. No. 4 234 435, it is known to add to an oil a composition having the effect of improving the dispersancy and the viscosity index. According to this patent, this composition contains at least one substituted compound, obtained by a thermal reaction between a polymer containing a carbon carbon double bond with an acid reagent or one of its derivatives, which reaction is, however, carried out in the presence of chlorine. This composition can be used as such or, if appropriate, after conversion by means of subsequent reactions.

A process has now been found to obtain a chlorine-free crosslinked polymer which can be used in a lubricant composition, and has the dual effect of improving the dispersancy and the viscosity index of the oil.

The present invention therefore relates to a process for the manufacture of a crosslinked polymer, characterised in that a crosslinking reaction is carried out between an organic crosslinking agent which is a polyacid or a derivative of a polyacid, and a long chain alkylpolyamine having at least two amine functional groups which may be primary and/or secondary and which is not a succinimide.

Thus, the invention is based on the surprising observation that it is possible to crosslink a long chain alkylpolyamine by reaction with a polyacid or with a derivative of a polyacid.

The long chain alkyl polyamine must contain at least two amine functional groups in order to be crosslinked. In addition, the alkylpolyamine must contain a long, straight or branched alkyl chain which contains, in general, from 10 to 800 carbon atoms. This long alkyl chain is most often derived from a polyolefin containing a carbon carbon double bond and in particular from a polybutene. The latter can be a polybutene prepared by polymerisation of but-1-ene or of cis- or trans-but-2-ene, or by copolymerisation of but-1-ene with cis- or trans-but-2-ene, in the presence of a cationic polymerisation catalyst. The polybutene can also be prepared by polymerisation of isobutene or by copolymerisation of isobutene with but-1-ene and/or cis- or trans-but-2-ene, in the presence of a catalyst of the cationic type, in particular a catalyst of the Friedel-Crafts type, such as aluminium trichloride, boron trifluoride, titanium tetrachloride or tin tetrachloride, or a chlorinated organoaluminium compound, if appropriate in the presence of a cocatalyst such as hydrochloric acid, tert-butyl chloride or water. The polybutene can advantageously be prepared by copolymerisation of a mixture of olefins having 4 carbon atoms and, in particular a mixture containing from 30 to 90% by weight of isobutene and from 10 to 70% by weight of but-1-ene and but-2-enes.

The polybutene used for the preparation of the alkylpolyamine suitably contains one carbon carbon double bond per molecule, arranged at the end of the chain.

This carbon carbon double bond can be trisubstituted in accordance with the following formulae:

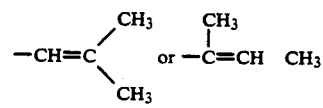

or tetrasubstituted in accordance with the formula:

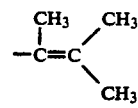

It can also be disubstituted of the vinylidene, in accordance with the formula:

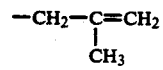

At least some molecules of the polybutene used for the preparation of the long chain alkylpolyamine suitably comprises vinylidene terminal double bonds of $>C=CH_2$ type e.g. from 1 to 90%, preferably from 40 to 85% with respect to all of the carbon carbon double bonds. In addition, it can have a weight average molecular weight, determined by vapor pressure osmometry or by gel permeation chromatography, in the range from 200 to 10,000, preferably from 330 to 5,000 and more particularly from 400 to 2,500. Thus, the polybutenyl group in the long chain alkylpolyamine can have, on average, from 4 to 180, preferably from 6 to 90 and more particularly from 7 to 45 C4 hydrocarbyl units. Consequently, it can contain from 16 to 720 carbon atoms, preferably from 24 to 360 carbon atoms and more particularly from 28 to 180 carbon atoms per molecule. It can have a viscosity, measured at 100° C., in the range from 0.002 to 100 Pa.s, preferably from 0.01 to 20 Pa.s and more particularly from 0.05 to 5 Pa.s. Moreover, the polybutene suitably has a relatively narrow molecular weight distribution. This distribution, calculated from the ratio of the weight average molecular weight, Mw, to the number average molecular weight, Mn, can be in the range from 1 to 5 and preferably from 1 to 3. The polybutene is a liquid or viscous product.

For example, polybutenes sold by BP Chemicals (Great Britain) under the commercial name "Ultravis" or "Napvis" ( Registered Trade Mark ) can be used for preparing the long chain alkylpolyamine.

The alkylpolyamine having a long hydrocarbon chain which is used in the process of the invention can be prepared by a method comprising reacting a corresponding long chain alkylcarbonyl compound with an amine. This method preferably comprises hydrogenation of the product from reaction of the alkylcarbonyl compound with the amine, which product can be a compound having an imine functional group. The alkylcarbonyl compound corresponding to the alkylpolyamine can be obtained from the polyolefin for example by a ozonolyzis. The alkylcarbonyl compound formed can be, if necessary, isolated. It also can be directly used without separation and/or isolation to form the alkyl-polyamine by reacting with the amine. Certainly the used amine comprises two or more amine functional groups.

A method for preparing a long chain alkylpolyamine which comprises the production of an intermediate imine is described in WO-A-90/09371.

In the method for preparing the long chain alkylpolyamine, maleic anhydride is not used. Consequently the obtained long chain alkylpolyamine is not an alkylsuccinimide.

According to the invention, the crosslinking agent used is a polyacid organic compound containing at least two carboxylic acid functional groups, or a derivative of such a polyacid. In general, the crosslinking agent has a relatively low molecular weight compared with that of the alkylpolyamine. The polyacid can be chosen from the customary organic diacids, such as oxalic acid, malonic acid, succinic acid, glutaric acid, adipic acid and pimelic acid. According to the invention, a polyacid derivative is suitably a polyacid in which at least one carboxylic acid functional group has been converted into a functional group such as an ester or acid anhydride functional group. In addition to the carboxylic acid functional groups and/or functional derivatives of such carboxylic acid, the crosslinking agent can contain other functional groups which are non-reactive with respect to the alkylpolyamine. In this case, the crosslinking agent can be ethylenediaminetetraacetic acid. However, in order to prevent premature ageing of the crosslinked polymer, the agent is preferably free from carbon carbon double bonds.

In the reaction between the long chain alkylpolyamine and the crosslinking agent, the acid functional groups or the functional derivatives thereof react with the primary or secondary amine functional groups in order to form amide functional groups. The crosslinking reaction generally takes place under atmospheric pressure and has a temperature which is most often high and can be in the range from 50° to 250° C. and preferably from 100° to 240° C. It can also take place in the presence of a hydrocarbon solvent, which may be a straight chain, a branched chain or a cyclic hydrocarbon, and can have from 5 to 20 carbon atoms. If the crosslinking agent contains carboxylic acid functional groups, the solvent can be chosen such that it forms a volatile azeotrope with the water originating from the crosslinking reaction. The reaction generally takes between 1 and 20 hours and most often between 2 and 6 hours.

The amounts of alkylpolyamine and of crosslinking agent used during the crosslinking reaction can vary within a wide range. However, it has been observed that the crosslinked polymer is a very good dispersing agent when the polyamine and the crosslinking agent are used in such a way that the molar ratio between all of the acid functional groups or functional derivatives thereof in the crosslinking agent and all of the primary or secondary amine functional groups in the polyamine is less than 1 and preferably less than 0.8.

According to a further embodiment, the present invention is a crosslinked polymer containing (a) internal amide functional groups and (b) long alkyl chains.

The crosslinked polymers of the present invention contain no chlorine and have a very high molecular weight as well as a very high viscosity. They can be used as an additive in lubricant compositions as well as in fuels.

Thus, it is possible to prepare lubricant compositions containing the crosslinked polymer which has the effect of a dispersing agent and of a viscosity index improver.

The following example illustrates the invention.

EXAMPLE

A) Preparation of a polybutenylketone (A)

2.55 kg of polybutene Napvis 10 ( Registered Trade Mark) having a number-average molecular weight of 950 g, 2.53 liters of n-octane and 285 ml of methanol were introduced into an ozonolysis reactor which had a volume of 10 liters and was provided with a cooling system and a twin-blade stirrer rotating at a speed of 200 revolutions per minute. The reactor was then cooled until a temperature of 0° C. was reached and air, containing dilute ozone, was bubbled through the contents of the reactor, which was kept stirred. This circulation was effected so as to measure a relative air pressure of 0.05 MPa at the reactor inlet and using an air flow rate of 100 l/h, which corresponded to an ozone flow rate of 0.118 mol per hour. In addition, before bubbling in the reactor, the air containing ozone passed through a vessel containing 0.5 l of methanol. The bubble of air in the reactor lasted 35 hours and at the end of this time cooling of the reactor was ceased so as to return to ambient temperature, of approximately 20° C. The contents of the reactor were then washed with 1.5 liter of demineralised water and finally transferred into a rotary evaporator so as to remove all of the lightweight products present and in particular the n-octane and the methanol initially introduced into the reactor. Under these conditions, a polybutenylketone (A) was obtained.

B) Preparation of a long chain polybutenylpolyamine (B)

253 g of the polybutenylketone (A) prepared above, 79.5 g of triethylenetetramine, 400 ml of n-octane and 10 g of hydrogenation catalyst containing 5% of platinum on active charcoal, sold by LANCASTER SYNTHESIS under the commercial reference 0566, were introduced into an autoclave provided with a stirring system rotating at 1,000 revolutions per minute and having a volume of 2 liters. Hydrogen was then introduced into the autoclave so as to obtain a pressure of 3 MPa. The autoclave was then heated at 165° C. for 5 hours. At the end of this time the autoclave was cooled and its contents were withdrawn in order to wash them with methanol to remove the unused triethylenetetramine and then to transfer them into a rotary evaporator operating under vacuum in order to remove the lightweight products which may have been formed in the autoclave and the n-octane. A polybutenylpolyamine (B) was thus obtained.

C) Production of a crosslinked polymer (C)

100 g of polybutenylpolyamine (B) were introduced into a 500 ml glass reactor provided with a stirring system rotating at 100 revolutions per minute.

The reactor was then placed under a nitrogen atmosphere so as to bubble nitrogen through the contents of the reactor. The reactor was heated to 115° C. and 28 g of adipic acid were introduced. The reactor was then heated at 210° C. for 1 hour. At the end of this time the reactor was cooled to 100° C. and 100 ml of xylene were introduced. The mixture thus obtained was cooled to ambient temperature, of about 20° C., then withdrawn from the reactor and finally transferred into a rotary evaporator. After evaporation of the xylene and the unused adipic acid under vacuum, the crosslinked polymer (C) was obtained.

Using (A) and (C) obtained as above, mixtures containing 20% by weight each of (A) or (C) respectively, with 80% by weight of neutral oil SN 500 having a viscosity of 0.121 m$^2$/s at 100° C., were prepared. The viscosity at 40° C., the viscosity at 100° C. and the viscosity index were determined for each mixture prepared and for the neutral oil alone in accordance with the standard ASTM D 2270-75. The various results obtained are shown in the Table below. They demonstrate clearly that the crosslinked product (C) was a good agent for improving the viscosity index.

TABLE

| Mixtures | A | C | Neutral |
|---|---|---|---|
| Viscosity at 40° C. (m$^2$/s) | 2.27 | 9.63 | 1.11 |
| Viscosity at 100° C. (m$^2$/s) | 0.205 | 0.604 | 0.121 |
| Viscosity index | 105 | 120 | 98 |

I claim:

1. A process for the manufacture of a crosslinked polymer comprising reacting an organic crosslinking agent which is a polycarboxylic acid or a derivative of a polycarboxylic acid, and a polyamine, other than a succinimide, substituted by a long alkyl chain having from 10 to 800 carbon atoms and having at least two amine functional groups which are selected from the group consisting of primary and secondary amines.

2. The process of claim 1 wherein the polyamine substituted by a long alkyl chain is obtained by reacting a corresponding long chain alkyl-carbonyl with an amine.

3. The process of claim 2 wherein the long chain alkylcarbonyl is obtained by ozonolyzis of a polyolefin.

4. The process of claim 3 wherein the polyolefin is a polybutene.

5. The process of claim 1 wherein the polycarboxylic acid is selected from the group consisting of oxalic acid, malonic acid, succinic acid, glutaric acid, adipic acid, pimelic acid and ethylenediaminetetraacetic acid.

6. The process of claim 1 wherein the crosslinking reaction is carried out at a temperature in the range from 50° to 250° C.

7. The process of claim 1 wherein the polyamine substituted by a long alkyl chain and the crosslinking agent are reacted such that the molar ratio between all of the carboxylic acid groups or carboxylic acid derivative groups in the crosslinking agent and all of the primary or secondary amine groups in said polyamine is less than 1.

8. The process of claim 4 wherein the polycarboxylic acid is selected from the group consisting of oxalic acid, malonic acid, succinic acid, glutaric acid, adipic acid, pimelic acid and ethylenediaminetetraacetic acid.

9. The process of claim 8 comprising reacting at a temperature in the range from 50° to 250° C.

10. A crosslinked polymer obtained by the process of claim 1.

11. A crosslinked polymer obtained by the process of claim 9.

12. A fuel composition containing the crosslinked polymer obtained by the process of claim 1, as an additive.

13. A lubricant composition containing the crosslinked polymer obtained by the process of claim 1, as an additive.

14. A fuel composition containing the crosslinked polymer of claim 11, as an additive.

15. A lubricant composition containing the crosslinked polymer of claim 11, as an additive.

* * * * *